(12) United States Patent
Sargent

(10) Patent No.: US 10,751,812 B2
(45) Date of Patent: Aug. 25, 2020

(54) INTERLOCKING FRAME FOR COMPUTER NUMERICAL CONTROL (CNC)

(71) Applicant: Glenn Robert Sargent, Binbrook (CA)

(72) Inventor: Glenn Robert Sargent, Binbrook (CA)

( * ) Notice: Subject to any disclaimer, the term of this patent is extended or adjusted under 35 U.S.C. 154(b) by 0 days.

(21) Appl. No.: 15/923,894

(22) Filed: Mar. 16, 2018

(65) Prior Publication Data

US 2019/0283145 A1    Sep. 19, 2019

(51) Int. Cl.
| *B23Q 1/01* | (2006.01) |
| *B23C 1/00* | (2006.01) |
| *F16M 11/04* | (2006.01) |
| *F16M 11/24* | (2006.01) |
| *F16B 5/00* | (2006.01) |
| *F16M 11/18* | (2006.01) |

(52) U.S. Cl.
CPC .............. *B23C 1/002* (2013.01); *B23Q 1/015* (2013.01); *F16B 5/002* (2013.01); *F16B 5/0024* (2013.01); *F16M 11/045* (2013.01); *F16M 11/046* (2013.01); *F16M 11/048* (2013.01); *F16M 11/24* (2013.01); *F16M 11/18* (2013.01)

(58) Field of Classification Search
CPC ........... B23C 1/007; B23C 1/002; B23C 9/00; B23C 9/005; B23Q 1/015; F16B 5/002; F16B 5/0024; F16M 11/045; F16M 11/046; F16M 11/048; F16M 11/24; F16M 11/18; A47B 39/00
USPC .................... 248/651, 678, 674, 672, 346.01; 297/440.1, 440.13, 338, 158.5
See application file for complete search history.

(56) References Cited

U.S. PATENT DOCUMENTS

| 3,300,245 A * | 1/1967 | Rumble | A47B 3/12 |
| | | | 108/158.12 |
| 3,989,399 A * | 11/1976 | Slowbe | E04B 9/127 |
| | | | 403/230 |
| 4,433,753 A * | 2/1984 | Watson | B25H 1/06 |
| | | | 182/151 |
| 4,890,972 A * | 1/1990 | Nekola | B60P 3/125 |
| | | | 280/402 |
| 5,251,955 A * | 10/1993 | Sarafa | A47B 3/14 |
| | | | 297/158.5 |
| 5,367,964 A * | 11/1994 | Hockensmith | A47B 3/14 |
| | | | 108/180 |
| 5,463,912 A * | 11/1995 | Inoue | H01R 13/62938 |
| | | | 403/321 |

(Continued)

*Primary Examiner* — Nkeisha Smith
(74) *Attorney, Agent, or Firm* — Orin Del Vecchio

(57) ABSTRACT

The present invention relates to a modular frame for CNC machining, comprising: a first side panel and a second side panel, each side panel for with an elongated base with a notch at either end and a vertical extension from the base with a notch at the distal end of the vertical extension; a first crossbeam and a second crossbeam, each crossbeam having a notch at either end, the notches on the crossbeam oriented in an opposing direction to the notches on the side panels; and a gantry beam, the gantry beam having a notch at either end, the notches on the gantry beam oriented in an opposing direction to the notches on the side panels, wherein the side panels, crossbeams and gantry beam are user-assembled into the modular frame via alignment and engagement of the respective notches on the crossbeams and gantry beam with the notches on the side panels, and wherein user assembly of the modular frame is performed without the use of tools.

16 Claims, 7 Drawing Sheets

(56) References Cited

U.S. PATENT DOCUMENTS

| | | | | |
|---|---|---|---|---|
| 6,619,749 | B2* | 9/2003 | Willy | A47B 3/06 |
| | | | | 108/158.12 |
| 6,634,712 | B2* | 10/2003 | Gamble | A47D 1/004 |
| | | | | 297/338 |
| 6,688,699 | B1* | 2/2004 | Bowie | A47C 4/021 |
| | | | | 297/440.13 |
| 8,985,533 | B2* | 3/2015 | Edmond | F16L 3/227 |
| | | | | 248/68.1 |
| 9,088,704 | B2* | 7/2015 | Harold | H04N 5/2252 |
| 2005/0102920 | A1* | 5/2005 | Hubbard | E04B 1/10 |
| | | | | 52/79.1 |
| 2009/0120889 | A1* | 5/2009 | Cebollero | A47B 17/00 |
| | | | | 211/134 |
| 2015/0196982 | A1* | 7/2015 | Caboni | B23C 3/00 |
| | | | | 425/4 R |
| 2017/0318961 | A1* | 11/2017 | Ramirez | A47B 97/04 |

* cited by examiner

INTERLOCKING FRAME FOR COMPUTER NUMERICAL CONTROL (CNC)

FIELD OF THE INVENTION

The present invention relates generally to computer numerical control (CNC) and, in particular, to a frame for CNC manufacturing assembled from interlocking components.

BACKGROUND OF THE INVENTION

Computer numerical control (CNC) is an automated manufacturing technique whereby a computer-controlled mechanism manufactures a product based on a computer-generated design. The manufacturing process takes place on a frame or gantry, where one or more tools are mounted, along with motors and electronic controls, to execute the design instructions. Tools and processes used may include cutting, grinding, hole punching, gluing, welding and bending, among others. More recently, new technologies, such as 3-D printing, are leveraging CNC for new manufacturing processes. As a result, demand for CNC frames, particularly on a consumer-scale, has increased dramatically.

However, the vast majority of CNC frames are formed from industrial materials and required substantial time and effort to assemble. Additionally, tools are generally required, and often custom tools, to assemble the frame, making disassembly and transport difficult, if not impossible. For amateur or hobbyist users, a frame made of lighter materials, such as plastic (e.g. ABS plastic) would be more manageable. Further, a lighter frame that may be assembled by hand without tools would also be more manageable and user-friendly for disassembly and reassembly for relocation and transport.

It would be desirable to have a CNC frame which mitigates some of these disadvantages.

Accordingly, there remains a need for improvements in the art.

SUMMARY OF THE INVENTION

In accordance with an aspect of the invention, there is provided a modular frame for CNC machining, comprising: a first side panel and a second side panel, each side panel for with an elongated base with a notch at either end and a vertical extension from the base with a notch at the distal end of the vertical extension; a first crossbeam and a second crossbeam, each crossbeam having a notch at either end, the notches on the crossbeam oriented in an opposing direction to the notches on the side panels; and a gantry beam, the gantry beam having a notch at either end, the notches on the gantry beam oriented in an opposing direction to the notches on the side panels, wherein the side panels, crossbeams and gantry beam are user-assembled into the modular frame via alignment and engagement of the respective notches on the crossbeams and gantry beam with the notches on the side panels, and wherein user assembly of the modular frame is performed without the use of tools.

According to an embodiment of the invention, each notch may further include one of a guide hole and a guide pin such that, when assembled, each engaged pair of notches has one guide hole and one guide pin in mutual connection. Alternatively, each notch may further include a guide hole and the frame further includes a plurality of dowels, such that one dowel is inserted into one of an engaged pair of guide holes in each engaged pair of notches during assembly.

According to a further embodiment of the invention, there is provided a kit of parts for user assembly without tools into a modular frame for CNC machining as described above and herein.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which.

Like reference numerals indicate like or corresponding elements in the drawings.

DETAILED DESCRIPTION OF THE EMBODIMENTS

The present invention relates generally to computer numerical control (CNC) and, in particular, to a frame for CNC manufacturing assembled from interlocking components.

Figure 1:
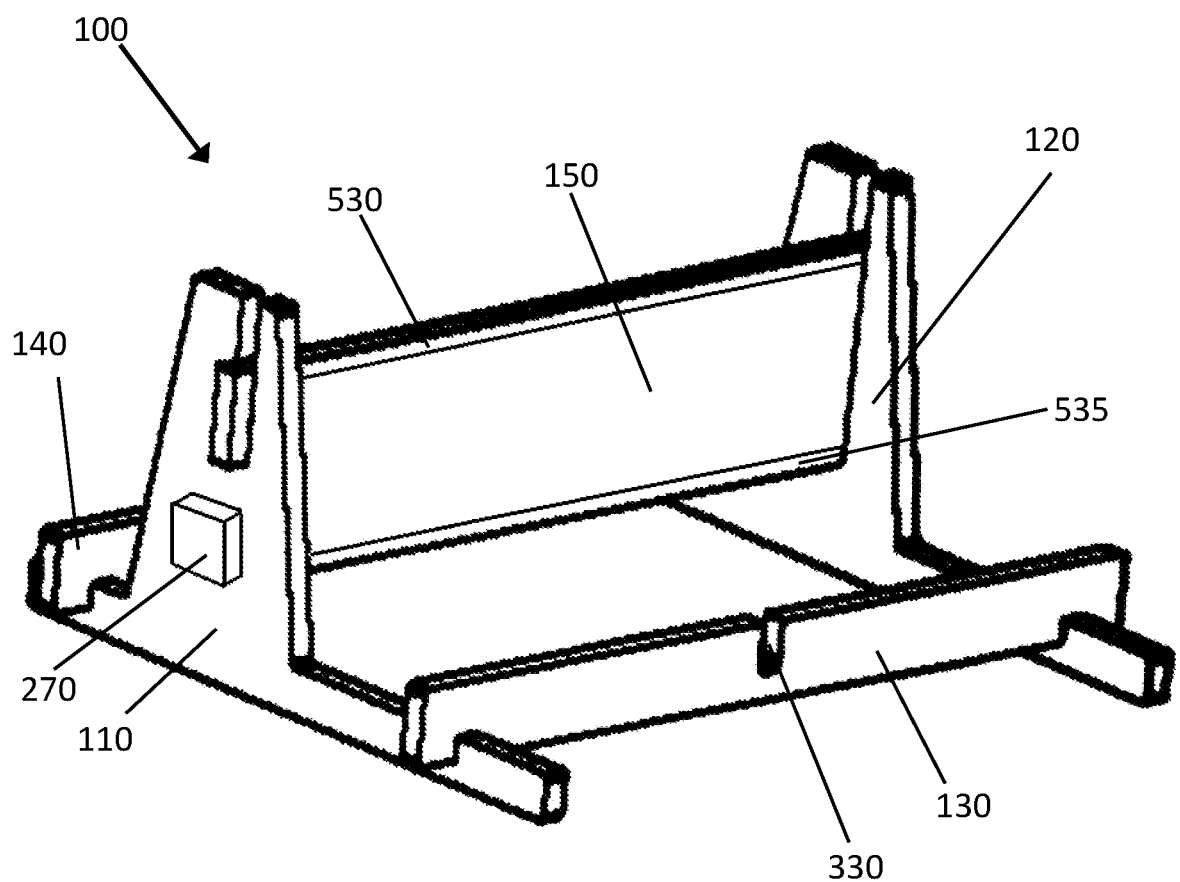
FIG. 1 is a perspective view of a CNC frame according to an embodiment.
Figure 2:
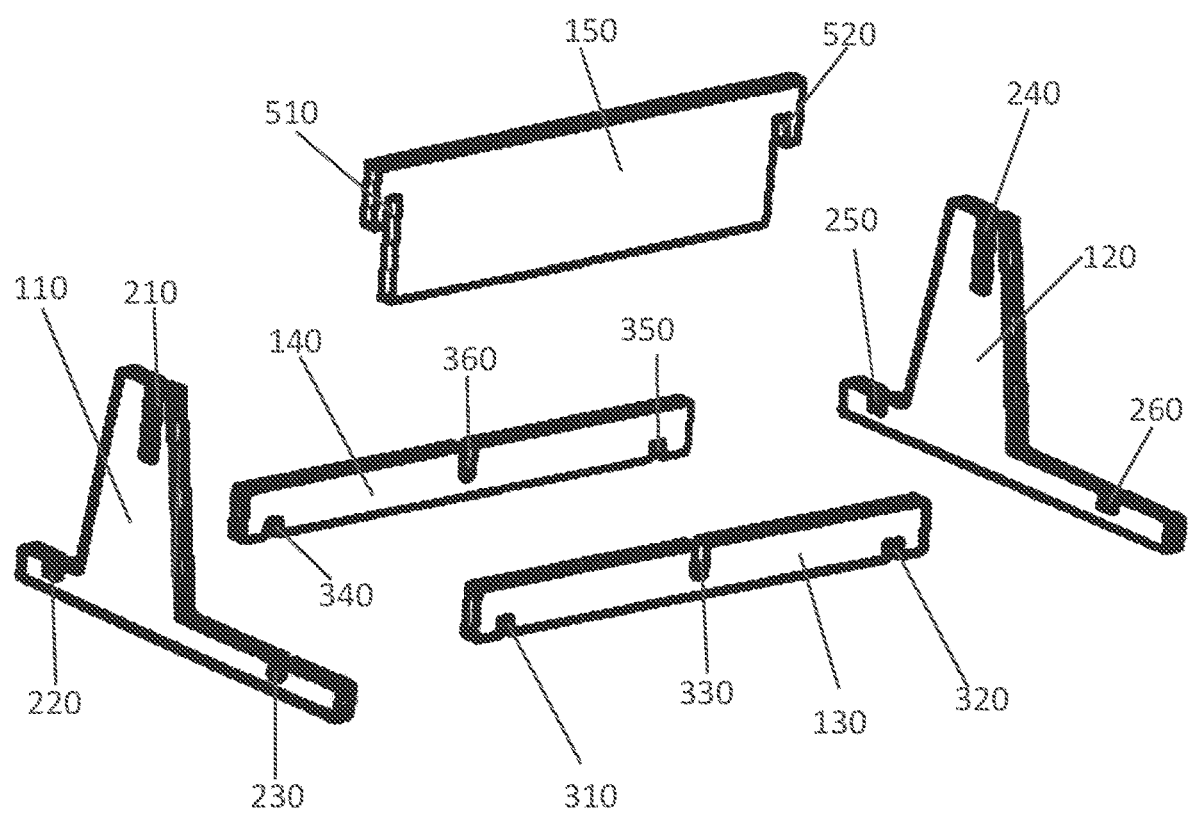
FIG. 2 is an exploded view of the frame of FIG. 1.

As shown in FIG. 1, according to an aspect of the present invention, a CNC frame 100 is formed from two side panels 110 and 120, two crossbeams 130 and 140 which connect to side panels 110 and 120 at their respective bases, and a gantry beam 150, which connects to the side panels 110 and 120 at their respective tops. An exploded view of CNC frame 100 is shown in FIG. 2, with the components arranged for assembly.

Figure 3A:
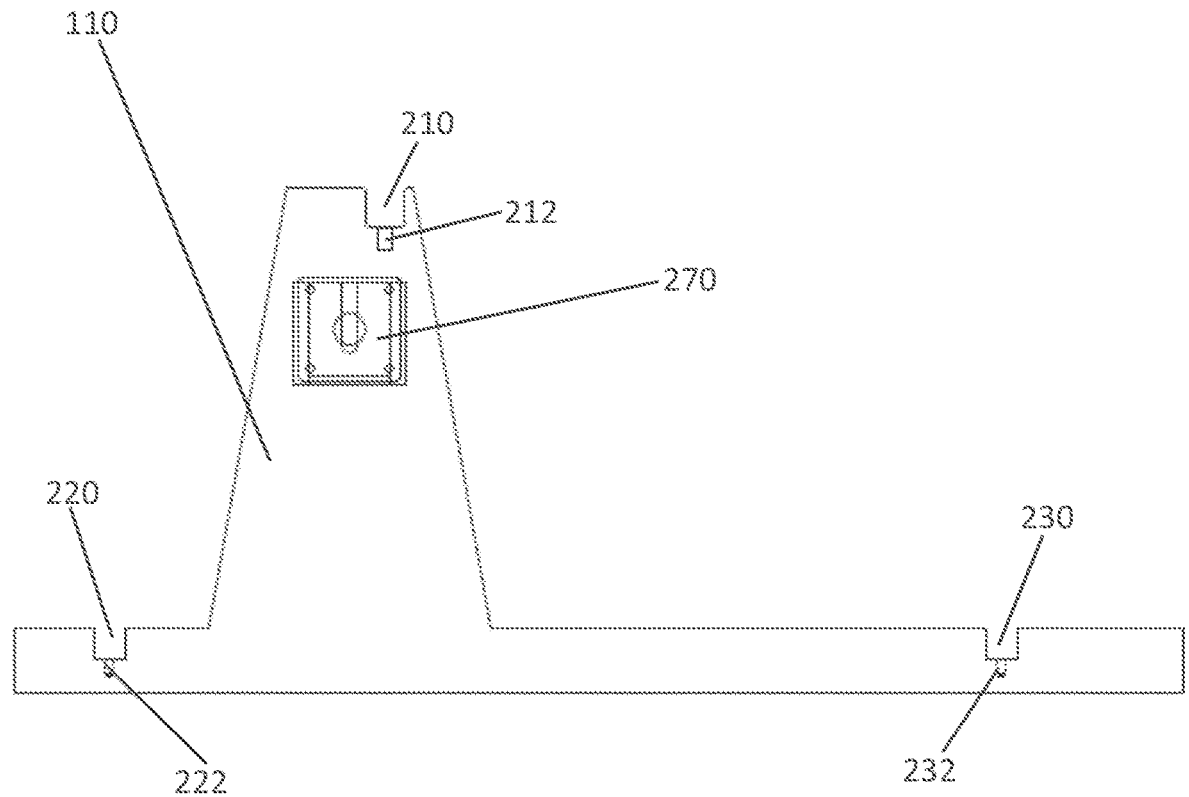
FIG. 3A is a side view of a side panel according to an embodiment.
Figure 3B:
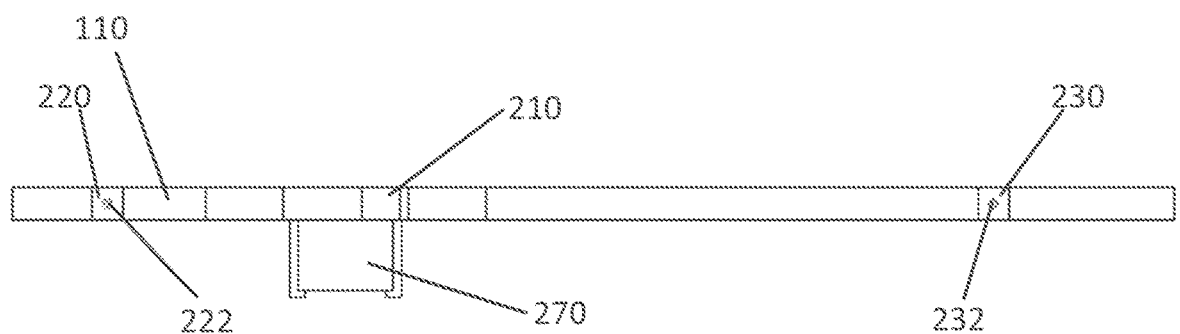
FIG. 3B is a top view of the side panel of FIG. 3A.

As shown in FIGS. 3A and 3B, side panel 110 is shaped substantially as an elongated A-frame, with an elongated base and a substantially triangular vertical extension from the base. Using side panel 110 shown in FIG. 3A as a reference, the side panel 110 may have an asymmetrical base, in order to provide an extended working surface area for the frame 100. An interlock notch 210 may be provided at top of the vertical extension, with the elongated base having a pair of interlock notches 220, 230 disposed to either side of the vertical extension.

Furthermore, taking notch 220 as an example, each notch may further include a guide hole 222 which accepts a guide pin 312 (see FIG. 5A) from the corresponding notch 310 on crossbeam 130 (see FIG. 5A) to further guide the user in assembling the frame 100, and to provide additional stability to the assembled frame 100.

Figure 4A:
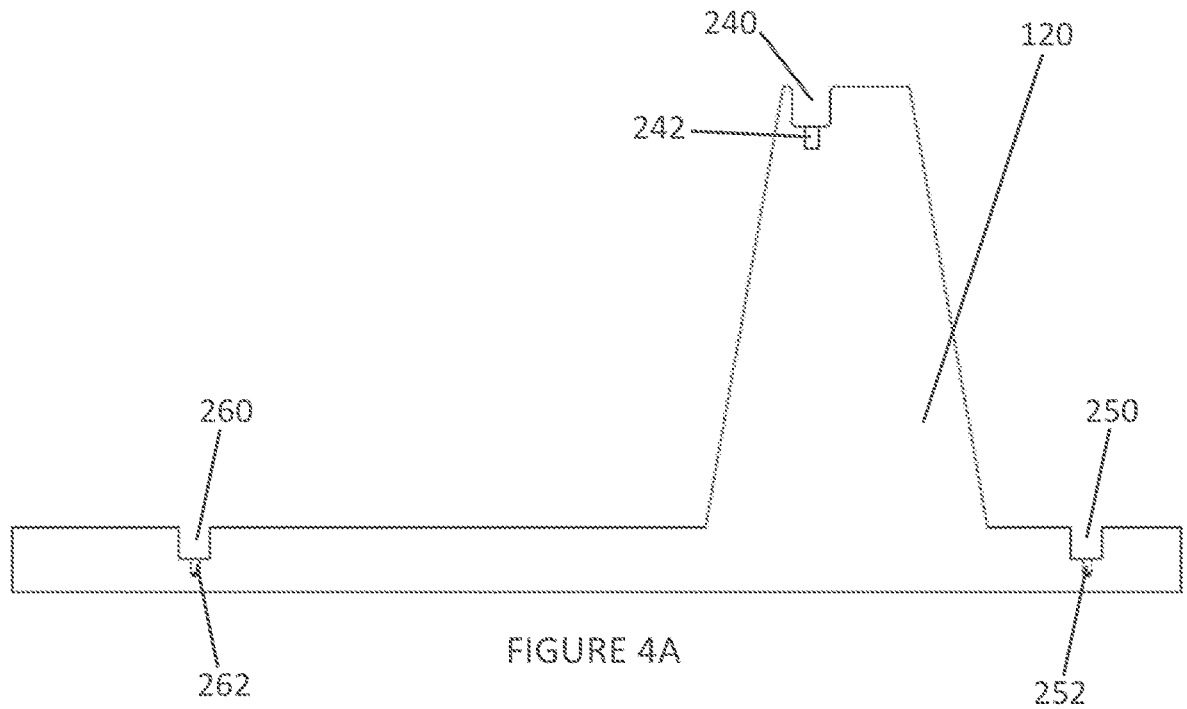
FIG. 4A is a side view of an opposing side panel to the side panel of FIG. 3A.
Figure 4B:
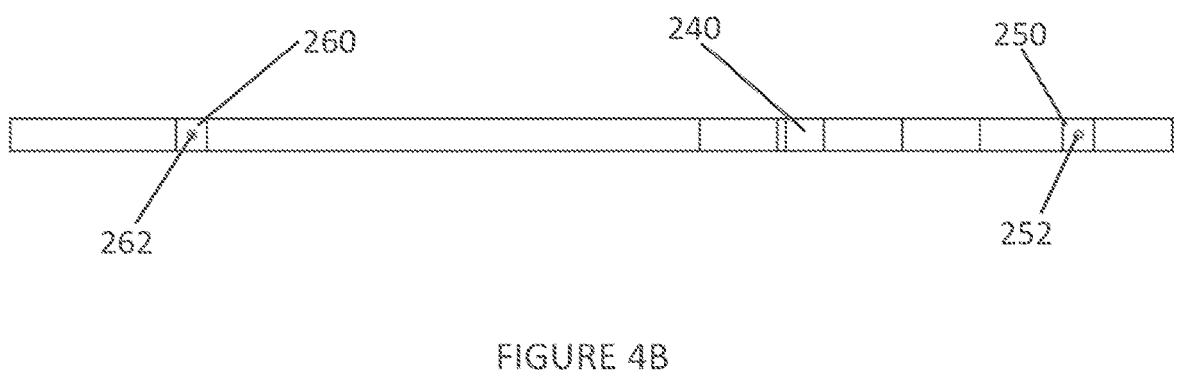
FIG. 4B is a top view of the opposing side panel of FIG. 4A

The opposing side panel 120 as shown in FIGS. 4A and 4B is a mirror image of side panel 110, with notches 240, 250 and 260 provided, with corresponding guide holes 242, 252 and 262.

While shown herein with guide holes in side panels 110, 120 and pins in crossbeams 130, 140 and gantry beam 150, the opposite arrangement may be applied. In another alternative, either of side panels 110, 120, crossbeams 130, 140 and gantry beam 150 may have one guide hole and one guide pin.

Additionally, side panel 110, as shown herein, may further include a motor housing 270 to support a motor assembly for moving a CNC device (not shown) along gantry beam 150. As shown, side panel 120 does not include a motor housing, however, one may be added to permit installation of a motor assembly on either side of the assembled frame.

Figure 5A:
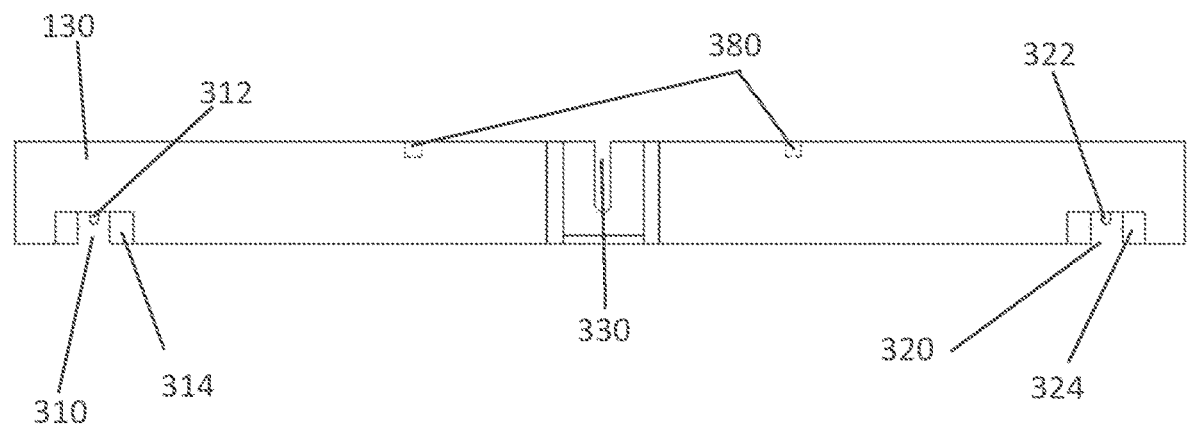
FIG. 5A is a side view of a first crossbeam according to an embodiment.
Figure 5B:
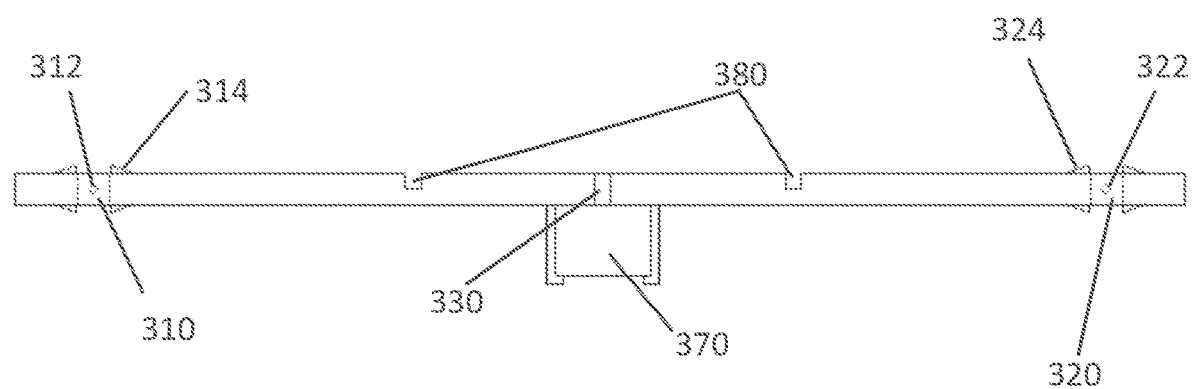
FIG. 5B is a front view of the crossbeam of FIG. 5A.

Referring to FIGS. 5A and 5B, crossbeam 130 (crossbeam 140 may be identical or mirror-imaged) may be substantially rectangular in shape. Taking crossbeam 130 as an example, interlock notches 310 and 320 may be provided to interlock with corresponding notches 230 and 260 on side panels 110 and 120, respectively. An additional notch 330 may be provided as a support for a motor shaft and lead screw for the CNC device. A motor housing 370 may also be provided on one or both crossbeams 130, 140.

Taking notches 310 and 320 as examples, each notch may be surrounded by straightening tabs 314, 324 which assist in ensuring that the assembled pieces are placed and secured at right angles to each other and may provide additionally stability to the assembled frame.

Figure 6A:
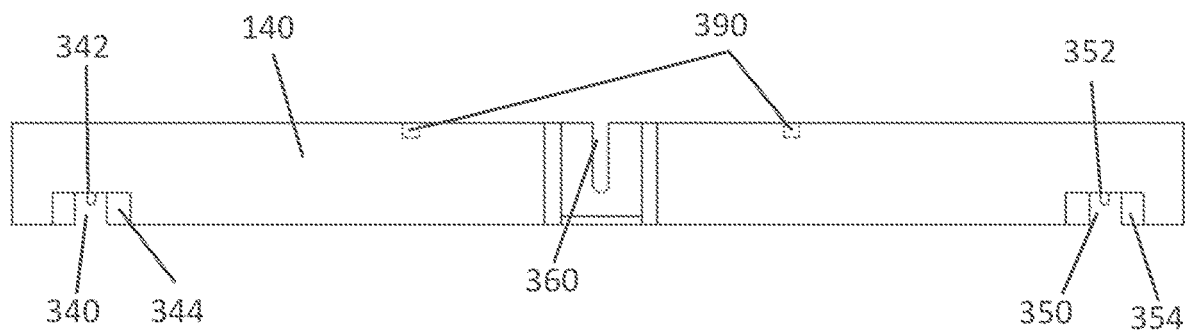
FIG. 6A is a side view of a second crossbeam according to an embodiment.
Figure 6B:
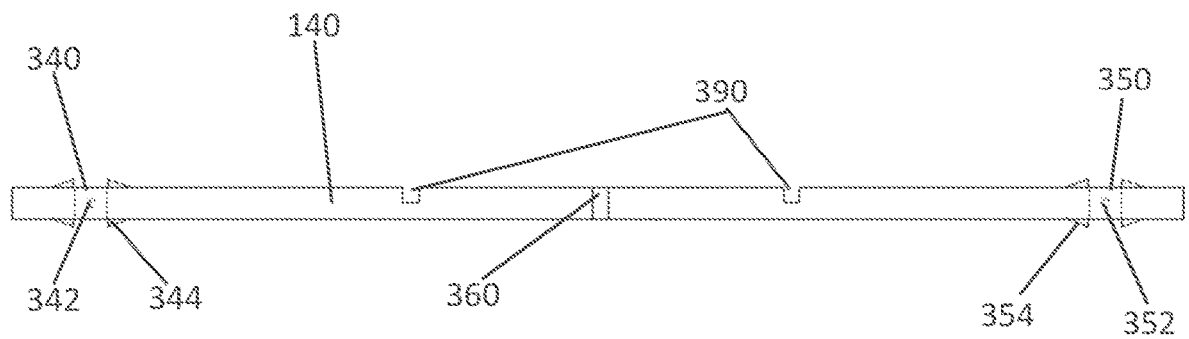
FIG. 6B is a top view of the crossbeam of FIG. 6A.

Crossbeam 140, shown in FIGS. 6A and 6B, is generally identical to crossbeam 130, with notches 340, 350 and 360, guide pins 342 and 352, and straightening tabs 344 and 354.

Alternatively, each notch (e.g. 310) may merely include a guide hole in lieu of guide pin 312, and the user would insert a separate appropriate sized dowel or pin [not shown] into the guide hole prior to assembly, and thus align the corresponding notch 230 with the inserted dowel or pin for assembly.

Additionally, crossbeams 130 and 140 may further include rail slots 380 and 390, respectively, to permit the insertion of guide rails for a movable working platform or bed, if desired.

Figure 7A:
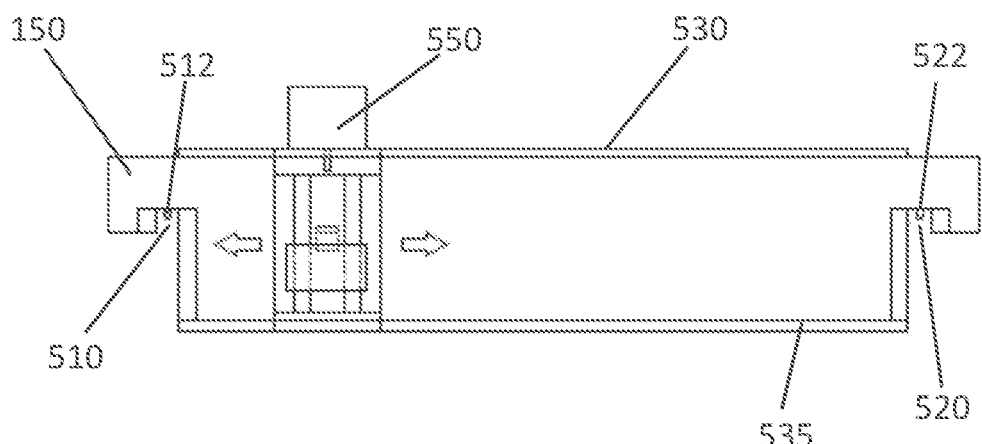
FIG. 7A is a front view of a gantry beam according to an embodiment.
Figure 7B:
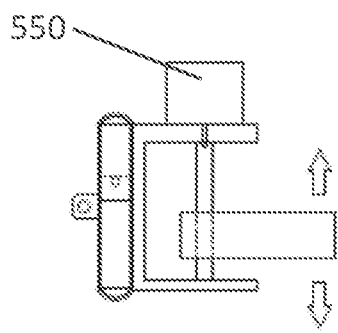
FIG. 7B is a side view of a working device according to an embodiment.

Gantry beam 150, as shown in FIG. 7A, is also of substantially rectangular shape, with interlock notches 510 and 520 which attach to corresponding notches 210 and 240 on side panels 110 and 120. Guide pins 512 and 522 may be provided to align with guide holes 212 and 242 for assembly. Gantry beam 150 may further include rails 530 and 535 to support a working device (Dremel, carving motor, etc.) as shown in FIG. 7B and enable movement of the working device 550 along gantry beam 150 in the direction shown in the arrows.

As discussed above and as shown in FIG. 7B, working device 550, such as a Dremel or carving motor, is moveable attached to gantry beam 150. In operation, working device 550 moves along gantry beam 150 in the direction shown in the arrows.

For assembly, the user connects the side panels 110, 120, crossbeams 130, 140 and gantry beam 150 to form the assembled frame 100. With side panels, crossbeams and gantry beam formed from lightweight materials, such as plastic, assembly may be performed by hand. Frame 100 may be similarly disassembled for storage or transport by reversing the process.

While the order of assembly is not essential, one such order is presented herein for reference. Crossbeam 130 is first secured to side panels 110 and 120 via notches 310 and 230, and via notches 320 and 260, by aligning pins 312 and 322 with guide holes 232 and 262. Crossbeam 140 is the secured to side panels 110 and 120 via notches 340 and 220 and notches 350 and 250 using pins 342 and 352 with holes 222 and 252. Lastly, gantry beam 150 is secured to side panels 110 and 120 via notches 510 and 210, and notches 520 and 240 using pins 512 and 522 with holes 212 and 242. Additional components, such as motors, guide rails, working devices and platform may then be attached as desired and required by the user.

As described in the examples herein, frame 100 is symmetrical in design along one axis, however, it is recognized that there may be occasions where an asymmetric design may be preferred for certain purposes or processes.

While the present invention is directed to CNC manufacturing, it is acknowledged that there are other processes similar to CNC manufacturing, such as 3-D printing, which operate using a frame or gantry, and that the present invention may be equally compatible with such processes.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A modular frame for CNC machining, comprising:
a first side panel and a second side panel, each side panel with an elongated base with a notch at either end and a vertical extension from the base with a notch at a distal end of the vertical extension and at least one of the side panels includes a motor housing;
a first crossbeam and a second crossbeam, each crossbeam having a notch at either end, the notches on the crossbeam oriented in an opposing direction to the notches on the side panels; and
a gantry beam, the gantry beam having a notch at either end, the notches on the gantry beam oriented in an opposing direction to the notches on the side panels,
wherein the side panels, crossbeams and gantry beam are user-assembled into the modular frame via alignment and engagement of the notches on the crossbeams and gantry beam with the notches on the side panels, and
wherein user assembly of the modular frame is performed without using of tools.

2. The frame of claim 1, wherein each notch on the crossbeams and the gantry beam further includes straightening tabs located on either external side of the notch.

3. The frame of claim 2, wherein, when assembled, each of the side panels, crossbeams and gantry beam are at right angles to one another at engagement of the notches.

4. The frame of claim 1, wherein each notch further includes one of a guide hole and a guide pin such that, when assembled, each engaged pair of notches has one guide hole and one guide pin in mutual connection.

5. The frame of claim 1, wherein each notch further includes a guide hole and the frame further includes a plurality of dowels, such that one dowel is inserted into one of an engaged pair of guide holes in each engaged pair of notches during assembly.

6. The frame of claim 1, wherein the gantry beam further includes one or more guide rails for supporting a working device.

7. The frame of claim 6, wherein the working device is a carving motor.

8. The frame of claim 1, wherein each crossbeam includes at least one rail notch for insertion of a guide rail for a moveable platform.

9. A kit for assembly into a modular frame for CNC manufacturing, comprising:
- a first side panel and a second side panel, each side panel with an elongated base with a notch at either end and a vertical extension from the base with a notch at a distal end of the vertical extension and at least one of the side panels includes a motor housing;
- a first crossbeam and a second crossbeam, each crossbeam having a notch at either end, the notches on the crossbeam oriented in an opposing direction to the notches on the side panels; and
- a gantry beam, the gantry beam having a notch at either end, the notches on the gantry beam oriented in an opposing direction to the notches on the side panels,
- wherein the side panels, crossbeams and gantry beam are user-assembled into the modular frame via alignment and engagement of the notches on the crossbeams and gantry beam with the notches on the side panels, and
- wherein the kit can be assembled without using of tools.

10. The kit of claim 9, wherein each notch on the crossbeams and the gantry beam further includes straightening tabs located on either external side of the notch.

11. The kit of claim 10, wherein each notch is cut such that, when assembled, each of the side panels, crossbeams and gantry beam are at right angles to one another at engagement of the notches.

12. The kit of claim 9, wherein each notch further includes one of a guide hole and a guide pin such that, when assembled, each engaged pair of notches has one guide hole and one guide pin in mutual connection.

13. The kit of claim 9, further comprising a plurality of dowels and wherein each notch further includes a guide hole, such that one dowel of the plurality of dowels is inserted into one of an engaged pair of guide holes in each engaged pair of notches during assembly.

14. The kit of claim 9, wherein the gantry beam further includes one or more guide rails for supporting a working device.

15. The kit of claim 14, wherein the working device is a carving motor.

16. The kit of claim 9, wherein each crossbeam includes at least one rail notch for insertion of a guide rail for a moveable platform.

* * * * *